Dec. 17, 1963
T. F. CARLSON
3,114,569
BALL-TYPE LINKAGE JOINT
Filed May 15, 1961
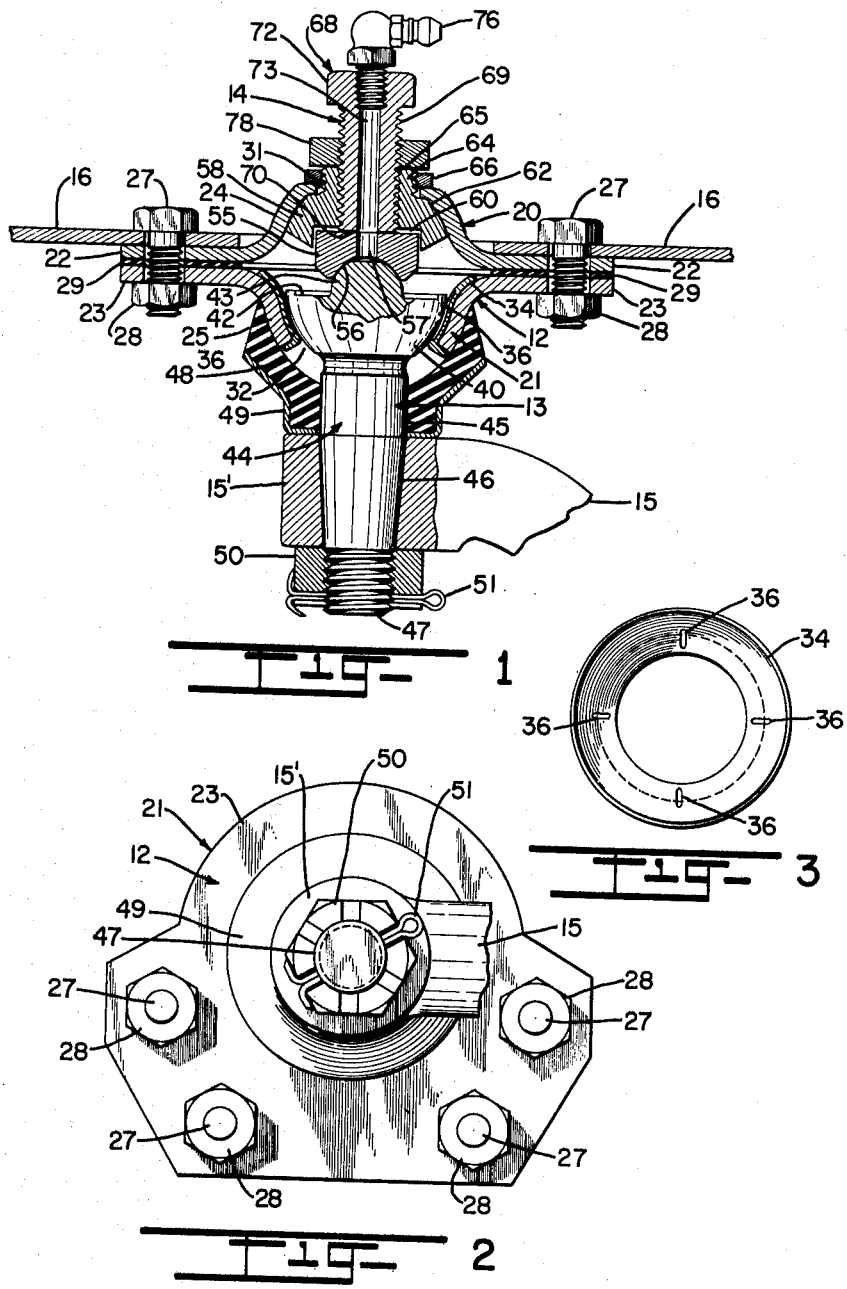
INVENTOR.
THEODORE F. CARLSON
BY
Philip H. Sheridan
ATTORNEY

United States Patent Office 3,114,569
Patented Dec. 17, 1963

3,114,569
BALL-TYPE LINKAGE JOINT
Theodore F. Carlson, 1986 S. Cherokee, Denver, Colo.
Filed May 15, 1961, Ser. No. 110,024
6 Claims. (Cl. 287—87)

This invention relates to a new, useful and improved ball-type joint particularly adaptable for use with wheel supporting linkage elements in automotive wheel suspensions, and the invention is particularly directed to an improved bearing and adjustable lock construction for use in association with such joints.

Ball joint assemblies are customarily employed as a means of connection for example in steering linkages for vehicles, since they permit a high degree of misalignment between elements and nevertheless will function properly without excessive wear usually caused by binding. In addition, bending stresses are largely eliminated permitting the use of lightweight parts to transmit substantial tensile or compressive loads. Moreover, ball joint assemblies permit rotation or oscillation over a considerable angular range between the connected members. On the other hand, some of the major considerations in assemblies of this type are the ability to withstand high stresses normally encountered, conformability for use with various systems, and ease of assembly and adjustment of the parts.

Essentially, the joint consists of two basic elements, namely, a ball stud unit and a housing or socket space; and in formation, it is highly desirable to make provision for optimum lubrication and bearing contact between the relatively moving parts as well as to be able to make rapid adjustments when necessary in order to avoid any looseness, or play, between the parts and at the same time to minimize bearing-surface wear. Furthermore, it is highly desirable to make provision for accurate centered alignment and engagement between parts throughout the life of the joint so as to eliminate unnecessary wear, and to eliminate dangerous looseness between elements without the necessity of closely regulating design tolerances and specifications.

Accordingly, it is a principal and foremost object of the present invention to provide for a ball-type linkage joint particularly adaptable for use in vehicular wheel suspension systems which is easy to fabricate and assemble out of a minimum number of parts, is easily and rapidly adjustable without disassembly, and has outstanding wear and life qualities.

It is another object to provide for a novel and improved type of bearing and locking assembly for use in a ball joint assembly which avoids the necessity of close tolerances between elements, permits more thorough lubrication, is easily adjustable from the exterior of the joint without disassembly and provides for even, minimum wear between the relatively moving parts while avoiding any looseness or play between elements.

It is a further object to provide a ball-type linkage joint which is easy to maintain, lubricate and adjust, is safe and dependable in operation and where all parts comprising the joints may be accurately centered and aligned in locked but adjustable relation in such a way as to insure against misalignment or looseness of any parts.

It is an additional object to provide, in a conventional ball-type joint broadly characterized by a socket or housing portion and a ball stud unit, an improved type of adjustable bearing assembly including a ball engaging portion which can be accurately aligned in centered relation to the ball and urged into firm bearing contact with the ball by means of an adjustable screw projecting into the socket portion, and which assembly is so designed as to provide for independent adjustment of the bearing parts relative to one another and to the ball stud unit yet can be securely locked in fixed relation to one another while enabling thorough lubrication of all the parts and optimum tiltable and rotatable movement of the ball stud unit in relation to the housing and bearing parts.

The above and other objects, advantages and features of this invention will become more readily understood from the following detailed description taken together with the accompanying drawings, in which:

FIGURE 1 is a front view partially in section of a preferred form of ball type linkage joint in accordance with the present invention.

FIGURE 2 is a bottom view of the assembly illustrated in FIGURE 1; and

FIGURE 3 is a detailed plan view of a preferred form of bearing insert employed in accordance with the present invention.

Referring in more detail to the drawings, there is shown by way of illustrative example a ball-type linkage joint 10 which, according to conventional practice, consists broadly of a housing 12 and ball stud unit 13, together with a new and improved bearing and locking assembly 14, according to the present invention.

For purposes of illustration, the joint 10 is shown as it might be connected as an upper ball joint in a steering linkage with the ball stud unit forming a means of connection for the steering knuckle 15, and a steering arm 16 being connected to the housing portion 12. In this basic relation, the ball stud unit 13 is free to rotate or oscillate in relation to the housing 12, and the assembly 14 is positioned in relation to the ball stud unit so as to permit such movement while eliminating any looseness or play between elements.

Referring more specifically to the elements comprising the joint 10, the housing 12 is defined by a pair of upper and lower, mating half-socket portions 20 and 21 which are each provided with relatively flat flange portions 22 and 23 and cup-shaped areas 24 and 25, respectively. The half-socket portions, along with the steering arm 16, are interconnected by suitable connecting means, such as cap screws 27 and nuts 28 with the cup-shaped portions 24 and 25 arranged in opposite facing relation to define the common housing or socket portion. Additionally, a rubber-like gasket 29 is interposed between the flanges 22 and 23 so as to seal the mating half-socket portions together.

The half-sockets 24 and 25 additionally include central, aligned openings 31 and 32 respectively, the opening or aperture 31 having the bearing and locking assembly 14 projecting therethrough and the opening 32 having the ball stud unit 13 projecting downwardly therefrom. One important feature in the construction of the housing is the utilization of a specially formed bearing insert or liner 34 which is preferably composed of phosphorus-bronze for improved wear characteristics. As best seen from FIGURE 3, the insert is of annular configuration conforming to the inner surface of the lower cup-shaped area 25 and is forced into press-fit relation with the lower cup-shaped portion by pressing the insert outwardly at spaced intervals about its periphery into the wall of the cup-shaped area. As illustrated in FIGURE 3, outward pressing or forcing of the insert at spaced intervals forms longitudinal depressions or grooves 36 along the bearing insert which, even under close engagement with the ball stud unit will permit the flow of grease through the grooves in and between the contacting surfaces.

The ball stud unit 13 is of conventional design and construction and may typically include a relatively large stud head portion 40 of spherical configuration having a flat upper surface 42 on which is positioned an integrally formed, relatively small, hemispherical ball member 43. The stud head 40 converges symmetrically at its lower end into a shank portion 44 having a straight cylindrical portion 45, a downwardly tapered portion 46 and a lower threaded extremity 47. In order to seal the lower end of the housing and stud head portion, a rubber-like bushing cup 48 is positioned on the cylindrical portion 45 in tight fitting surrounding relation to the cup-shaped area 25, and a retainer seal 49 is positioned to hold the bushing cup 48 in place. The shank is tapered as at 46 to provide for connection of boss 15' forming the upper extremity of the steering knuckle 15 and the boss is held in place by means of nut 50 threaded onto the lower end, the latter having a cotter pin 51 to lock the nut in firm engagement against the lower end of the boss.

An important feature of the present invention is the construction and arrangement of the bearing and locking assembly 14 which, in a unique way, can be accurately adjusted and aligned for centered engagement with the ball 43, and can be locked securely in place in firm bearing engagement against the ball 43 so as to remove all looseness and play while permitting the desired rotating and oscillating movement of the ball stud unit in relation to the housing and the bearing assembly 14. Most important, however, the assembly 14 enables locking, unlocking and relative adjustment between the parts, independently of one another, without requiring any disassembly or removal of elements whatsoever and where all the adjusting elements are positioned exteriorly of the socket portion so as to enable ease of access whenever adjustment is required. Nevertheless, the assembly 14 enables the passage of grease into and around the interior elements within the socket while sealing the entire unit against the entry of dust or foreign particles. In order to accomplish the above, the assembly 14 is defined by a floating seat 55 of generally cylindrical configuration, flat at the top, with a concave ball-engaging seating surface 56 at its lower end and a central grease passage 57 extending vertically therethrough. The seat 55 is preferably composed of non-galling anti-friction material such as phosphorus-bronze. To loosely center and align the floating seat in relation to the ball 43, an adjusting seat 58 is positioned above the floating seat within the socket portion and the adjusting seat includes a lower cavity 60 corresponding generally to the exterior configuration of the top of the floating seat but being of an enlarged diameter in relation thereto and having an outer, upwardly tapered surface 62 conforming to the inner surface configuration of the cup-shaped part 24 of the upper half-socket. Forming an upward continuation of the adjusting seat and projecting outwardly through the opening 31 is a hollow stem 64 which is externally threaded and, in common with the adjusting seat, has an internally threaded central passage 65 extending therethrough. A lock nut 66 is positioned on the stem for threaded engagement with its external surface to lock the adjusting seat in place preferably with the outer surface 62 bearing against the inner surface of the socket portion.

The threaded passage 65 is formed principally for reception of adjusting screw 68 which includes an externally threaded, elongate stem 69 dimensioned for threaded engagement and movement through the adjusting seat 58 and having a lower flat extremity 70 to engage the top, relatively flat, surface of the floating seat 55 so as to urge it downwardly into centered engagement with the ball 43. The uper extremity of the adjusting screw 68 is formed as at 72 for reception of a suitable wrench or other tool for inward and outward threading of the adjusting screw in relation to the adjusting seat and floating seat. Additionally, the adjusting screw includes a central grease passage 73 which is centrally located and axially aligned with the grease passage 57 of the floating seat and the uper end of the grease passage is internally threaded for reception of the threaded end of a grease fitting 76. In order to lock the adjusting screw in desired relation to the floating seat and adjusting seat, a lock nut 78 is predisposed thereon, prior to inward threading of the screw through the adjusting seat, so that the lock nut 78 is disposed between the upper end of the stem 64 and the tool engaging part 72 of the screw; when desired, it may be threaded downwardly to engage the top extremity of the stem 64 and to affix the adjusting screw securely in relation to the seat portions.

From the foregoing description of the bearing and locking assembly 14, it will be evident that, as wear takes place or adjustment is necessary for example between the floating seat 55 and ball 43, it is only necessary to release the locking nut 78 from engagement with the stem whereupon the adjusting screw 68 may be adjusted either inwardly or outwardly as required. Similarly, if it is desired to independently adjust the seat 58, it is only necessary to loosen the lock nut 66 or tighten it as required, along with the lock nut 78. It will be noted here that by utilization of separate floating and adjusting seats, the floating seat will be loosely maintained in desired relation to the ball by the adjusting seat 58, then upon inward threading of the adjusting screw, as the end surfaces of the screw and floating surface move into flush engagement, the floating seat will be accurately aligned in centered relation to the top surface of the ball 43; however, the annular seat, while surrounding the upper portion of the floating seat, will not restrict any slight movement necessary under rotation or oscillation of the ball and it has been found that this eliminates a great deal of wear between the elements; also, the above makes possible the use of special material in forming the floating seat, specifically designed to avoid undue frictional engagement between the bearing surfaces while being capable of withstanding high compressional loads. It will be further noted that grease may be injected preferably by loosening the lock nuts so as to allow some clearance between the ball 43 and floating seat for the grease to pass downwardly through the central passages in the assembly 14 in and around the ball 43 and stud head portion 40. As mentioned previously, the special formation of the bearing insert will permit the passage of grease between the stud head and bearing surfaces, thereby to permit complete lubrication of the joint.

Based on the foregoing, it is believed that the improved joint of the present invention incorporates a number of features in construction and assembly which makes it particularly suitable for use in vehicular or automotive wheel suspension systems as described. Additionally, the joint is conformable for use with a number of other linkage systems and applications, such as in brake systems, heavy duty machinery and equipment as well as for smaller machines where the joints could be formed of reduced size and broadly, in any application requiring combined rocking and rotating movement between elements while avoiding any undue looseness or play at the point of connection. It is further to be understood that various modifications and changes may be made in the formation and composition of parts and materials comprising the joint of the present invention without departing from the scope thereof, as defined by the appended claims.

What is claimed is:

1. In a ball-type linkage joint having a socket portion defining an enclosed space with oppositely directed, aligned openings extending through the socket portion, and a ball stud member having a shank projecting through one opening, said stud being rotatable and tiltable in relation to the socket, the improvement comprising adjustable bearing means for the ball stud unit, said bearing means including a floating seat in the socket having a grease passage therethrough and having a concave ball-engaging surface composed of antifriction material, seating means in said socket for loosely centering said floating seat in relation to the ball, said seating means including a hollow internally and externally threaded stem attached to said seating means projecting through the other opening, said seating means having a threaded passage therethrough continuous with the hollow of said stem, first locking means to retain said seating means in stationary relation in the socket including a lock nut threadably engaging the outer threads of said stem and securing it in said socket, an inner concentric screw being externally threaded for threaded engagement with said threaded passage and passing through said stem and seating means into firm engagement with said floating seat whereby to urge the latter into intimate contact with the ball, and second locking means externally threaded over said screw and abutting the head of said stem to retain said screw in fixed but adjustable relation to said stem and floating seat, said screw having a channel therethrough for delivery of lubricating material to said floating seat, said locking means, stem and screw all being exteriorly accessible for independent adjustment relative to each other and to the ball stud unit.

2. In a ball-type linkage joint according to claim 1, said screw, seating means and floating seat providing a common passage for the injection of grease into said socket.

3. In a ball-type joint according to claim 2, said seating means being provided with a generally cup-shaped cavity, enlarged in relation to the size of said floating seat, for loosely centering said floating seat in relation to said ball.

4. In a ball-type joint according to claim 3, said floating seat being composed of a non-galling, anti-friction material.

5. A ball-type linkage joint for interconnecting an arm and link comprising, half-socket portions interconnected in opposed facing relation, said half-sockets having central aligned apertures and one half-socket being lined with a bearing insert including spaced longitudinal grease passages, a ball stud unit disposed in the one half-socket with the stud being sized for projection in spaced relation through the aperture of one half-socket, and the ball portion having a hemispherical wear surface, a floating seat interposed between said half-sockets in engagement with said wear surface, an adjustable seat adapted to loosely center said floating seat with respect to said ball and including an externally and internally threaded outer concentric, tubular stem projecting outwardly through the aperture of said other half-socket, an adjustable seat lock nut threaded externally on said stem to lock said adjustable seat in said other half-socket, an elongated adjusting screw threaded through said stem into engagement with said floating seat to urge it against said hemispherical wear surface, said screw including a tool-engaging outer end portion for inward and outward adjustment thereof, and locking means threadably engaging said screw between said outer end portion and the terminal end of said stem and bearing against the terminal end of said stem whereby to simultaneously lock said screw and adjustable seat in fixed relation to one another and with the inner end of said screw bearing against the end of said floating seat in centered relation opposite said wear surface, whereby by adjustment of said adjustment screw said floating seat may be positioned with respect to said wear surface, and independent adjustment of said adjustment screw and floating seat may be accomplished with respect to said adjustable seat.

6. A ball-type linkage joint for interconnecting an arm and steering link in an automotive wheel suspension system comprising, half-socket portions interconnected in opposite facing relation, said half-sockets having central aligned apertures and one half-socket being lined with a bearing insert composed of phosphorous-bronze, said insert having spaced depressions holding said insert in place and defining longitudinal grooves for the passage of grease therethrough, a ball stud unit disposed in the one half-socket against said insert with the stud being sized for projection in spaced relation through the aperture of the one half-socket, and the ball portion having a hemispherical wear surface, a floating seat including a grease passage interposed between said half-sockets in engagement with said wear surface, an adjustable seat including a cup-shaped cavity conforming to the inner surface of the other half-socket and being adapted to loosely center said floating seat with respect to said ball, said adjustable seat including an externally and internally threaded outer concentric, tubular stem projecting outwardly through the aperture of said other half-socket, an adjustable seat lock nut threadable on said stem to lock said adjustable seat in said other half-socket, an elongate adjusting screw dimensioned for threaded passage through said outer stem into engagement with said floating seat to urge it against said wear surface, said screw including a grease passage, a grease fitting and a tool-engaging outer end portion for inward and outward adjustment thereof, and a lock nut dimensioned for threaded engagement with said screw between said outer end portion and the outer terminal end of said stem and to bear against the terminal end of said stem, said screw and adjustable seat being locked in fixed relation to one another with the inner end of said screw bearing against the end of said floating seat in centered relation opposite said wear surface.

References Cited in the file of this patent
UNITED STATES PATENTS

| | | |
|---|---|---|
| 2,095,381 | Donaldson | Oct. 12, 1937 |
| 2,876,030 | Booth | Mar. 3, 1959 |

FOREIGN PATENTS

| | | |
|---|---|---|
| 698,473 | Great Britain | Oct. 14, 1953 |